US011476764B2

(12) United States Patent
Salonen

(10) Patent No.: US 11,476,764 B2
(45) Date of Patent: Oct. 18, 2022

(54) ADAPTIVE DC TO DC CONVERTER FOR USE WITH A LOAD AND CHARGER

(71) Applicant: L7 Drive Oy, Karjalohja (FI)

(72) Inventor: Daniel Salonen, Karjalohja (FI)

(73) Assignee: L7 Drive Oy, Karjalohja (FI)

(*) Notice: Subject to any disclaimer, the term of this patent is extended or adjusted under 35 U.S.C. 154(b) by 0 days.

(21) Appl. No.: 17/059,304

(22) PCT Filed: May 28, 2019

(86) PCT No.: PCT/FI2019/050411
§ 371 (c)(1),
(2) Date: Nov. 27, 2020

(87) PCT Pub. No.: WO2019/229297
PCT Pub. Date: Dec. 5, 2019

(65) Prior Publication Data
US 2021/0143738 A1    May 13, 2021

(30) Foreign Application Priority Data
May 29, 2018  (FI) .................................. 20185485

(51) Int. Cl.
*H02J 7/04*       (2006.01)
*H02M 3/158*  (2006.01)
(Continued)

(52) U.S. Cl.
CPC ......... *H02M 3/1582* (2013.01); *H02J 7/0063* (2013.01); *H02J 7/04* (2013.01); *H02M 1/081* (2013.01)

(58) Field of Classification Search
CPC .. H02M 3/155; H02M 3/1582; H02M 3/1584; H02J 7/0063; H02J 7/007; H02J 7/04; H02J 7/045
See application file for complete search history.

(56) References Cited

U.S. PATENT DOCUMENTS

2008/0062724 A1   3/2008  Feng et al.
2011/0254372 A1*  10/2011  Haines ..................... H02J 9/062
                                                                                 307/66
(Continued)

FOREIGN PATENT DOCUMENTS

EP      2337184 A2    6/2011
FI      20175938 A1   4/2019
JP      2013138530 A  7/2013

*Primary Examiner* — Nguyen Tran
(74) *Attorney, Agent, or Firm* — Laine IP Oy

(57) ABSTRACT

According to an example aspect of the present invention, there is provided a direct current (DC) to DC converter module for use between an electrical storage device, electric power source and an electric load. The converter module having at least one DC to DC converter; first input terminals connected to inputs of the DC to DC converter; output terminals connected to outputs of the DC to DC converter; second input terminals connected to the outputs of the DC to DC converter; and control circuitry connected to the DC to DC converter, the control circuitry being configured to monitor at least one of a voltage and current at the second input terminals. The control circuitry is configured to control the DC to DC converter in order to adjust a gain or conversion factor of the DC to DC converter based at least partially on the monitored voltage and/or current at the second input terminals.

14 Claims, 4 Drawing Sheets

(51) Int. Cl.
*H02J 7/00* (2006.01)
*H02M 1/08* (2006.01)

(56) References Cited

U.S. PATENT DOCUMENTS

| | | |
|---|---|---|
| 2012/0025751 A1 | 2/2012 | Bakas et al. |
| 2015/0001932 A1* | 1/2015 | Inoue .................. H02J 3/46 |
| | | 307/24 |
| 2016/0096437 A1 | 4/2016 | Tripathi et al. |
| 2018/0090981 A1 | 3/2018 | Yamaguchi et al. |
| 2020/0204093 A1 | 6/2020 | Salonen |

* cited by examiner

ADAPTIVE DC TO DC CONVERTER FOR USE WITH A LOAD AND CHARGER

BACKGROUND

As discussed within Finnish Patent Applications 20175422 and 20175938, incorporated herein by reference, a (Direct Current) DC to DC converter module may be employed to variably raise or lower a DC voltage on demand for supply to an electric motor. That is, the DC to DC converter adaptively adjusts the difference between the input and output voltages to arrive at the optimum voltage for driving an electric motor or other load. This is in contrast to traditional DC to DC converters which merely raise the voltage to a preset level and then allow switches to lower the voltage when a load or motor is to be driven at less than the power provided by the raised voltage.

In the field of solar power, Maximum Power Point Tracking (MPPT) modules utilize various components, including DC to DC converters, in order to ensure that the load seen by solar panels allows for optimal power transfer from the panels. These MPPT modules are employed to help account for the fact that the output of solar panels varies based on the amount of exposure to the sun.

While MPPT tracking modules ensure that the maximum power is derived from a connected solar panel, they are designed to ensure that solar panels provide the best charging or power supply conditions and do not consider the overall optimal solution for a system employing a charger, such as a solar panel, variable load, such as an electric motor and energy storage device, such as a battery.

SUMMARY OF THE INVENTION

The invention is defined by the features of the independent claims. Some specific embodiments are defined in the dependent claims.

According to a first aspect of the present invention, there is provided a direct current (DC) to DC converter module for use between an electrical storage device, electric power source and an electric load. The DC to DC converter module comprising: at least one DC to DC converter; first input terminals connected to inputs of the DC to DC converter and configured to provide a source voltage from an electrical storage device; output terminals connected to outputs of the DC to DC converter and configured to provide an output voltage to an electric load; second input terminals connected to the outputs of the DC to DC converter and configured to provide a charging voltage to the output of the DC to DC converter from an electric power source; and control circuitry connected to the DC to DC converter, the control circuitry being configured to monitor at least one of a voltage and current at the second input terminals. The control circuitry is configured to control the DC to DC converter in order to adjust a gain or conversion factor of the DC to DC converter based at least partially on the monitored voltage and/or current at the second input terminals.

EMBODIMENTS

Definitions

In the present context, the term DC to DC converter module is used. Such modules are often referred to as drives or electric drives. As such the term DC to DC converter module should be understood to include but not be limited to a drive or electric drive.

As discussed throughout this application, intermittent energy sources are sources of energy, primarily electric energy, which do not provide a consistent energy output.

Electric parameters as discussed herein include but are not limited to: voltage, current, phase, frequency and phase shift.

Within the present context it should be understood that the terms solar panel and photovoltaic (PV) panel are used interchangeably.

At least some embodiments of the present invention allow for electric drives which optimize the use of connected energy sources. For example, DC to DC converter modules or drives according to some embodiments of the present invention allow for a solar panel to be connected between a battery and electric motor such that energy usage from the solar panel and battery is optimized. By connecting the charging source between an energy storage device and electric load, DC to DC converter modules according to the present invention are capable of adapting their function based on a large variety of factors while increasing efficiency and limiting energy losses of the system as a whole.

Figure 1:
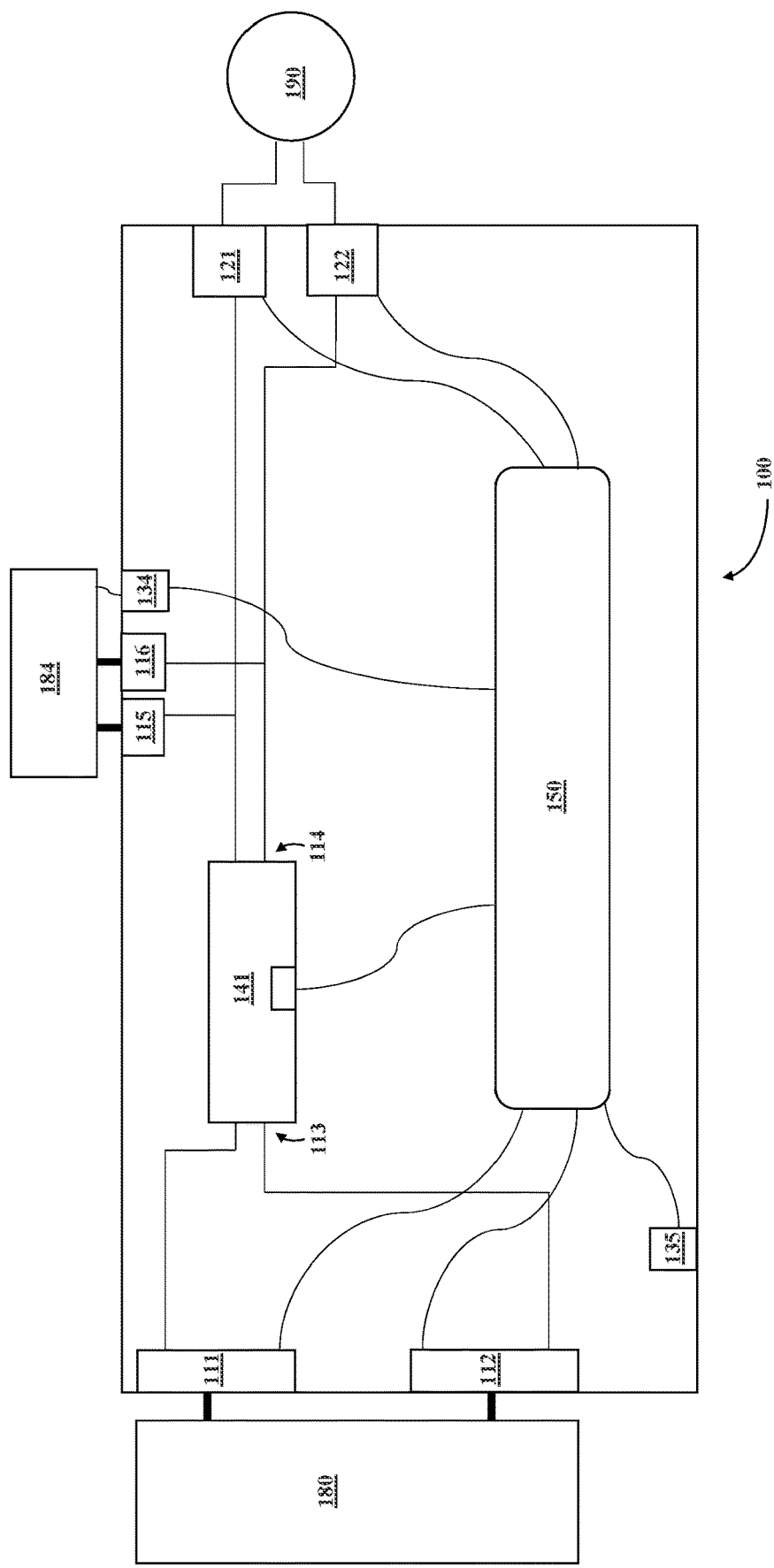
FIG. 1 illustrates a DC to DC converter module in accordance with at least some embodiments of the present invention.

FIG. 1 illustrates a DC to DC converter module 100 in accordance with at least some embodiments of the present invention. As shown the DC to DC converter module 100 is configured for use between an electrical storage device 180, electric power source 184 and an electric load 190. Many embodiments of the present invention find use with electrical storage devices such as, for example, batteries, single-cell batteries, capacitors, battery banks of a sailboat and other electrical storage means. At least some embodiments find use with renewable electric power sources such as photovoltaic or solar panels, wind turbines, or even grid power. Finally many DC to DC converter modules according to the present invention would find use with electric motors, lights and a variety of electric loads, especially loads with a variable draw.

As seen in FIG. 1, the DC to DC converter module 100 comprises, a DC to DC converter 141; first input terminals 111, 112 connected to inputs 113 of the DC to DC converter 141 and configured to provide a source voltage to the DC to DC converter from an electrical storage device 180; output terminals 121, 122 connected to outputs 114 of the DC to DC converter 141 and configured to provide an output voltage to an electric load 190; and second input terminals 115, 116 connected to the outputs 114 of the DC to DC converter 141 and configured to provide a charging voltage to the output of the DC to DC converter 141 from an electric power source.

As can also be seen in FIG. 1, the DC to DC converter comprises control circuitry 150 connected to the DC to DC converter 141, the control circuitry 150 being configured to monitor at least one electrical parameter at at least one of the terminals. The control circuitry 150 is configured to adjust a gain or a conversion factor of the DC to DC converter 141 based at least partially on the monitored electric parameter.

Within at least some embodiments of the present invention the control circuitry 150 is configured to monitor an electrical parameter at the second input terminals 115, 116 and to adjust a gain or a conversion factor of the DC to DC converter 141 based at least partially on the monitored electric parameter of the second input terminals.

At least some embodiments of the present invention employ control circuitry configured to monitor a plurality of voltages and/or currents from at least two sets of terminals. Some embodiments employ control circuitry 150 further configured to monitor at least one of voltage and current at the first input terminals 111, 112 and the control circuitry 150 is configured to adjust the gain or conversion factor of the DC to DC converter 141 based at least partially on the monitored voltage and/or current at the first input terminals. Certain embodiments monitor voltages and/or currents from all three terminals of the converter module and the control circuitry 150 is configured to adjust the gain or conversion factor of the DC to DC converter 141 based at least partially on three monitored values, one monitored value from each of the terminals. Within embodiments which monitor voltage and/or current at more than one set of terminals, the control circuitry may be configured to adjust the gain of the DC to DC converter based at least partially on one or more monitored values from one or more monitored terminals. For example, the control circuitry 150 may be configured to adjust the gain of the DC to DC converter 141 based on one monitored value from the first input terminals and on another monitored value from the second input terminals.

At least some embodiments of the present invention employ control circuitry configured to monitor at least one of a voltage and current at all input and output terminals. Some monitor only the conditions at the charging or second input terminals and the output terminals.

The control circuitry within at least some embodiments of the present invention monitors voltage and currents supplied or sourced at the terminals either directly or indirectly. That is, the control circuitry may be conductively connected to the terminals in order to directly monitor the terminals. Certain control circuitry is configured to work with current and/or voltage meters either integrated with or external to the control circuitry. Monitoring of conditions at the terminals may also be accomplished wirelessly, via meters which monitor conditions at the terminals and communicate said conditions to the control circuitry wireless.

Also illustrated within FIG. 1 is an optional communications interface 134. At least some control circuitry according to the present invention monitor conditions at terminals via communications interface configured to supply information on the connected device at the terminals. Certain embodiments of the present invention monitor the conditions of connected devices through communications interfaces of the converter module. Communications interfaces may be employed, for example, to monitor a solar panel connected at the second input terminals wherein the communications interface may provide the present current and voltage supplied by the panel.

Further illustrated within FIG. 1 is an optional input 135 configured to receive a signal indicative of a desired power delivery to the attached load 190. At least some DC to DC converter modules according to the present invention contain such an input, sometimes referenced as a communications interface, configured to receive a signal indicative of a desired power delivery to the electric load wherein the control circuitry is further configured to adjust the gain or conversion factor of the DC to DC converter based at least partially on the desired power delivery. Certain DC to DC converter modules having such an input contain control circuitry which is configured to adjust a gain or conversion factor of the DC to DC converter(s) based at least on a combination of the desired power delivery and the monitored electric parameter.

Within DC to DC converter modules according to at least some embodiments of the present invention adjustment of the gain or conversion factor of the DC to DC converter takes place via the modification of the duty cycle. For example, when the DC to DC converter is a buck boost DC to DC converter the modification of the duty cycle modifies the difference between the input and output voltage of the converter. The final result of the adjustment is to control the difference between the input DC voltage and output DC voltage of the DC to DC converter. This adjustment could be accomplished, for example, by simply controlling the manner in which a switch signal is sent to the DC to DC converter, for example the amount of time the control circuitry outputs a switch signal could be adjusted to arrive at the desired conversion factor for the DC to DC converter.

Certain DC to DC converts according to the present invention employ control circuitry 150 which is configured to adjust the gains of the DC to DC converter such that electrical power flows in a desired direction. The control circuitry 150 within at least some embodiments of the present invention is configured to operate the DC to DC converter(s) of the DC to DC converter module in one or more preset fashions such that electrical energy flows either:

1: from the second input terminals solely to the first input terminals,
 2: from the second input terminals solely to the output terminals,
 3: from the second input terminals to both the input terminals and output terminals, or
 4: from both the first input and second input terminals to the output terminals.

Embodiments of the present invention employing a combination of preset modes above allow the DC to DC converter module to operate at peak efficiency or with a specific goal. In at least some embodiments of the present invention an external switch is provided for a user to select which mode the module should operate in. For example, it may be preferable to utilize as much energy as possible from the second input terminals when a renewable energy source is connected to such a terminal. The switch could allow a user to select whether it is a renewable or cheap energy source connected at the second input terminals. Given this information the converter module would then try and utilize as much energy from the second input terminals as possible, even at the expense of overall efficiency.

In at least some embodiments a user may select which mode the DC to DC converter module should operate in based on a desired outcome. That is, the user may select a charging mode in which the energy is guided from the second input terminals to the first input terminals. Such a mode may limit the output provided by the module. This could, for example, be beneficial when employed on a sailing vessel and the user would like to charge the batteries while operating an electric motor.

Certain embodiments of the present invention provide for operating in a boost mode. That is, energy from the second input terminals is utilized to provide energy to the output terminals and any shortfall is met by sourcing energy from the first input terminals. This mode could find use when it is desirous to use energy from an intermittent energy source connected at the second input terminals to drive a load with a demand that may occasionally exceed the energy provided by the intermittent source.

At least some embodiments of the present invention have the ability to automatically switch between operating modes. This may be done, for example, to arrive at a peak overall operating efficiency of the module. For example, allowing the DC to DC converter to adjust based on a demand at the output terminals would provide for the most efficient use of energy stored in the energy storage device, but may not allow for use of any energy source connected at the second input terminals. While having the DC to DC converter adjust to demand may provide 7% efficiency gains over a fixed gain DC to DC converter, those efficiency gains would not make up for foregoing all energy derived from an attached wind turbine or solar panel. This would at least be the case because energy sourced from a wind turbine or solar panel is essentially free. Certain embodiments of the present invention provide for automated switching between modes when the DC to DC converter module is driving a load, for example when an attached motor is running.

In some embodiments of the present invention employing automated switching between modes it is necessary to employ a switch to disconnect a connected energy source. These switches may be implemented as discussed below and allow for uninterrupted delivery of power to a load and safe switching between modes.

DC to DC converter modules according to certain embodiments of the present invention allow for selective use of charging energy. This provides for the ability to maximize the use of energy supplied from both a storage and charging source. For example, when using energy from both input terminals, certain DC to DC converter modules according to the present invention allow for the energy input at the second terminals to power the majority of the output while filling any shortfall in required energy from the storage means. This could, for example, allow for a connected charging source to operate at a constant output while providing for a variable output to load. This could be especially beneficial in situations when a connected charging source, such as a solar panel, will operate most efficiently at a certain output but a connected load, such as an electric motor, will have a variable demand which can be fulfilled by a storage means connected to the converter module.

DC to DC converter modules according to at least some embodiments of the present invention would be especially well suited for uses aboard sailboats wherein there is a solar panel or wind turbine providing a charging capacity at the second input terminals. This charging source would be within the voltage range of 12-28 volts, for example, 24 volts. The electric storage device in such a situation would typically be in the form of a battery bank having a voltage of 3.2 volts for a single cell battery to 12 volts for the typically deep cycle marine battery. The DC to DC converters could be employed to ensure proper charging voltage for the battery bank, but at the same time would find use in optimally driving an attached load such as an electric motor or saildrive which may require an even higher voltage to operate.

As illustrated within FIG. 1 the control circuitry 150 may be communicatively connected to each of the terminals. While represented as simple lines within FIG. 1 this communicative connection may be accomplished wirelessly and, it may involve the direct monitoring of voltage and current at a set of terminals or through use of a communications interface or other measurement means.

Within at least some embodiments of the present invention the control circuitry 150 is further configured to adjust a gain or a conversion factor of the DC to DC converter 141 to maintain at least one of the monitored electric parameters within a present range. This preset range may be, for example, a preset charging current, a minimum voltage for an attached battery or a minimum current or voltage necessary to drive a load. At least some embodiments of the present invention implement a MPPT scheme when connected to a PV panel as a charging source.

Figure 2:
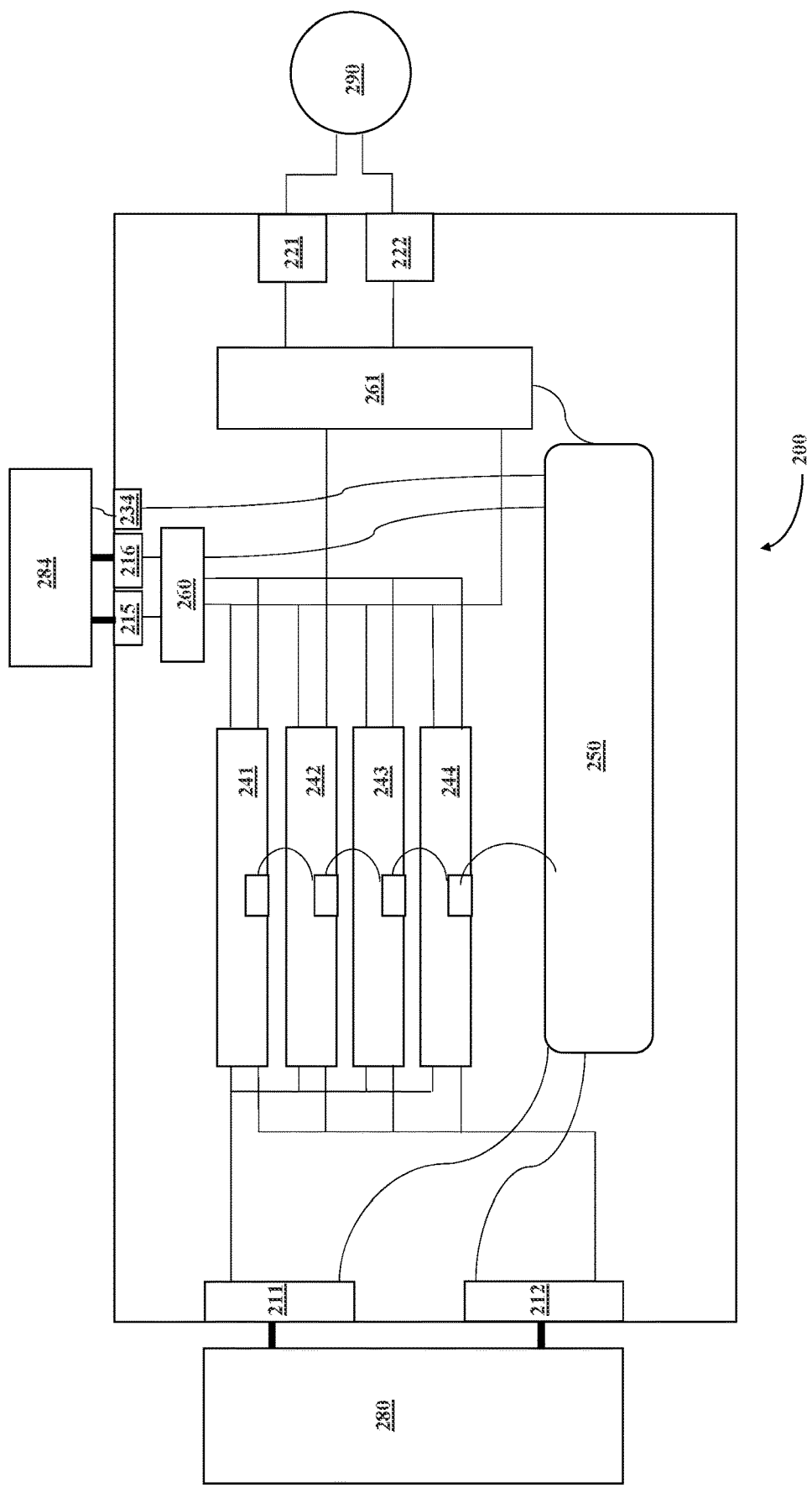
FIG. 2 illustrates a DC to DC converter module having a plurality of DC to DC converters and switches in accordance with some embodiments of the present invention.

FIG. 2 illustrates a DC to DC converter module 200 comprising a plurality of DC to DC converters 241-244 connected in parallel according to at least some embodiments of the present invention. As seen, the DC to DC converter module is once again configured for use between an electric load 290, an electric storage device 280 and an electric power source 284. The module itself comprises a plurality of DC to DC converters 241-244; first input terminals 211, 212 configured to provide a source voltage to the DC to DC converters from an electrical storage device 280; output terminals 221, 222 connected to outputs of the DC to DC converters 241-244 and configured to provide an output voltage to an electric load 290; and second input terminals 215, 216 connected to the outputs of the DC to DC converters 241-244 and configured to provide a charging voltage to the output of the DC to DC converters 241-244 from an electric power source.

As further illustrated within FIG. 2, the DC to DC converter again comprises control circuitry 250 connected to the DC to DC converters 241-244, the control circuitry 250 being configured to monitor at least one of a voltage and current supplied at the second input terminals 215, 216. An optional control interface 234 is also shown.

Within the embodiment illustrated within FIG. 2 the control circuitry is configured to control the DC to DC converters 241-244 in order to adjust a gain or conversion factor of the DC to DC converters based at least partially on the monitored voltage and/or current.

FIG. 2 also illustrates sets of switches 260 and 261 for controlling connection to the electric power source 284 and electric load 290 respectively in accordance with at least some embodiments of the present invention. The switches may be implemented in a variety of fashions, such as, for example by using MOSFETs. The set of switches 261 employed between the electric load 290 and DC to DC converters 241-244 may be used to drive a connected motor, for example a connected DC or AC electric motor.

The first set of switches 260 provides the ability to disconnect the second input terminals 215, 216 from the DC to DC converters 241-244. This can allow for a method to protect the circuitry of the DC to DC converter modules from overvoltage of a connected charging source such as a photovoltaic or solar panel. The switches 260 also serve to protect against PV breakdown by disconnecting a connected PV in the event a breakdown is detected by the control circuitry 250. As discussed above, such switches also enable switching between operation modes in at least some embodiments of the present invention.

The second set of switches 261 provide for a means to disconnect the DC to DC converters from the output terminals 221, 222. These second set of switches are sometimes referred to as load switches. In at least some embodiments of the present invention the load switches 261, in connection with the control circuitry 250 are operated to control a connected load. In at least some embodiment the second set of switches 261 are used to prioritize charging, such as solar charging, operations. This allows for the converter modules to optimize the efficiency between the energy source and the connected load when the voltage of the energy source is low compared to the output. For example, with a solar panel connected to the system, the operation of the motor control will be prioritized to use energy from the solar panel. In order to accomplish this, the converters can be set to ensure that maximum power is delivered from the solar panel. In certain embodiments the second set of switches would act as a motor controller operating at a fixed input voltage and using any number of methods to arrive at the appropriate output voltage, for example, pulse width modulation. While this mode of operation may sacrifice efficiencies normally gained by adjusting the DC to DC converters to optimize energy derived from an attached storage means, it would ensure that the maximum power is derived from the attached charging means. In this fashion the converter module can choose to adjust the DC to DC converters to optimize the energy input which provides the most overall gain.

In at least some embodiments of the present invention having a load switch 261 located between the output of the DC to DC converter module 241 and the output terminals 221, 222, the load switch is connected to the control circuitry 250 and configured to control the output of the converter module 200 in order to control the operation of a connected load 290. For example, the load switch 261 and control circuitry 250 may be configured to output a modulated voltage such that a connected motor may be operated at varying speeds. At least some embodiments of the present invention provide for both an input for a signal indicative of a desired power delivery to a connected load and load switches 261 configured to provide the desired power delivery.

As shown within FIG. 2, at least some embodiments of the present invention employ a plurality of DC to DC converters 241-244 connected in parallel.

Within embodiments of the present invention providing for DC to DC converter modules having selective optimization many benefits are achieved. For example, the efficiency of using free energy from the attached charger, if it is a renewable source such as a solar panel, when available is far superior compared to energy from a connected battery at any efficiency. However, when there is very little or no energy available from the seconding input terminals or a connected charging source, the drive will shift to operate a variably DC to DC conversion mode and thus achieve more efficient use of stored energy. Further, at least some embodiments allow for adaptive operation based on shifting demand at the output terminals. For example, during hard acceleration of a vehicle employing a DC to DC converter module according to the present invention, the module can prioritize stored energy use to ensure the desired acceleration. After the acceleration, when the demands have decreased, the module can then switch back to operating off of the connected charging source alone or a combination of stored and renewable energy.

Figure 3A:
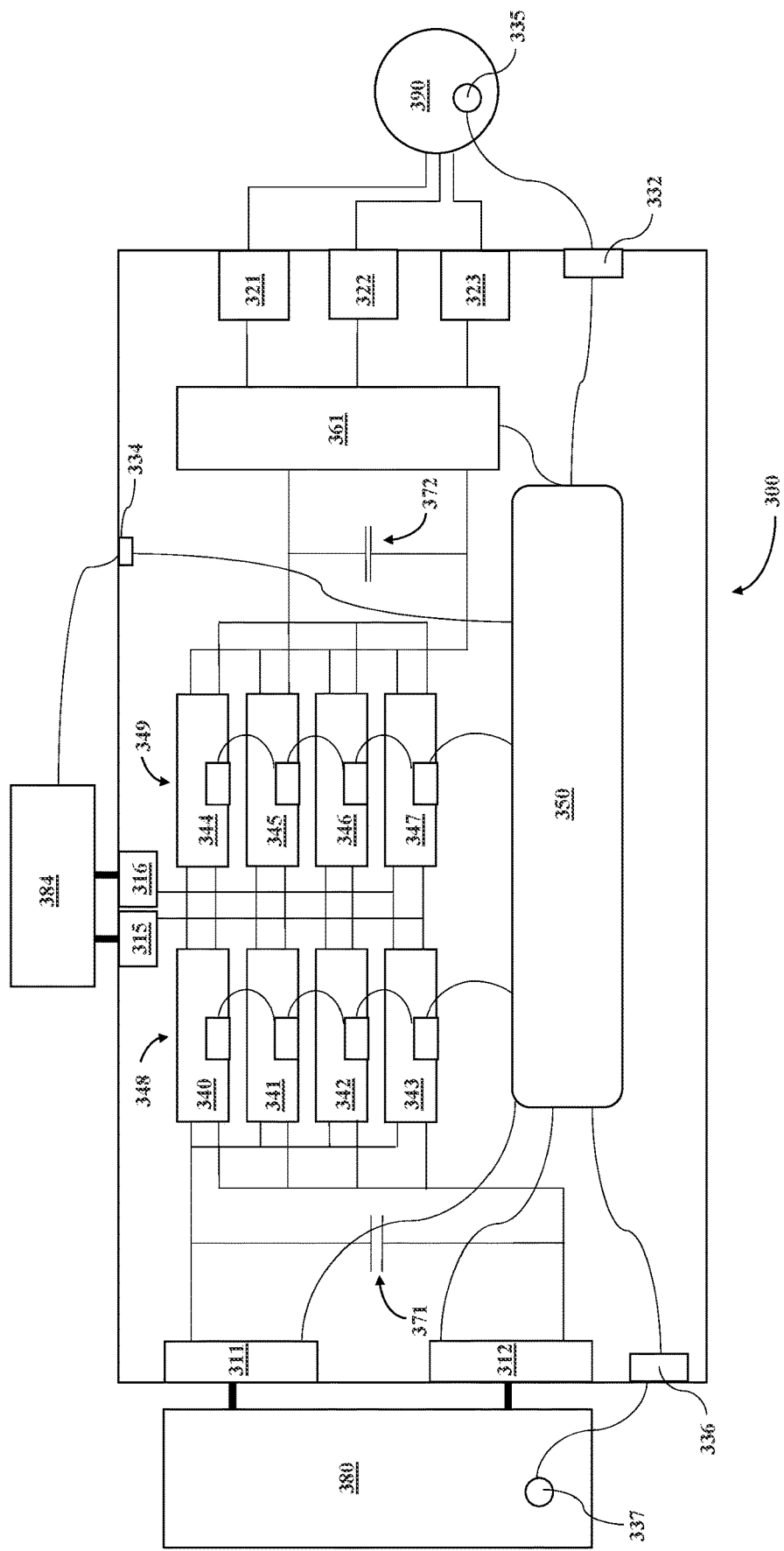
FIGS. 3A and 3B illustrate DC to DC converter modules having two phases of DC to DC conversion in accordance with certain embodiments of the present invention.

FIG. 3A illustrates a DC to DC converter module 300 according to certain embodiments of the present invention wherein the DC to DC converters 340-347 are arranged in at least two stages. A first stage 348 arranged to convert the source voltage to an intermediate voltage and a second stage 349 arranged to convert the intermediate voltage to the output voltage, the second input terminals 315, 316 being connected at the intermediate voltage. As seen, the DC to DC converter module 300 is once again configured for use between an electric load 390, an electric storage device 380 and an electric power source 384. The module itself comprises first input terminals 311, 312 configured to provide a source voltage to the first stage of DC to DC converters 348 from an electrical storage device 380. Second input terminals 315, 316 configured to be connected between the first and second stages 348, 349 and output terminals 321, 322, 323 connected to outputs of the second stage DC to DC converters 344-344 and configured to provide an output voltage to an electric load 390.

As shown within FIG. 3A the second input terminals 315, 316 provide a charging or input voltage at an intermediate voltage between the first and second stage 348, 349 of DC to DC converters. In this fashion the DC to DC converters can be controlled individually or in groups by stage to more finely control how energy flows between the three terminals. For example, when employed in a sailboat, the electric energy source could be a PV panel providing charging current to a battery bank. The connected load could then be an AC motor used to propel the boat. Given the two stage configuration of the DC to DC converter module illustrated within FIG. 3, the PV panel could provide charging current, driving current or a combination depending on the adjustment of the DC to DC converters.

As discussed herein the intermediate voltage is any voltage between an input and output voltage. The intermediate voltage may be higher or lower than either the input or output voltage. As shown within FIG. 3A the intermediate voltage is merely the voltage between two sets of DC to DC converters.

Within DC to DC converter modules employing the two stage DC to DC conversion as shown within FIG. 3A, it is possible to use energy from an energy source attached at the second terminals regardless of the sources characteristics. For example if a PV panel, wind turbine or other renewable source is attached at the second input terminals and is only providing a weak output, the first stage of DC to DC converters may only increase the voltage a small amount or even decrease the voltage supplied by the energy storage means to ensure that energy provided at the second input terminals is guided to an attached load. Alternatively, if the attached renewable source is providing a high voltage input and charging of the energy storage device is not desired, the intermediate voltage can be adjusted to ensure that all provided energy flows to an attached load. As shown, the configuration of FIG. 3A is very versatile and allows for a great degree of control regarding the flow of energy through the converter module.

Within DC to DC converter modules employing multiple DC to DC converters, connected in parallel or series and in one or more stages, the DC to DC converters may be controlled individually or in groups. Individual control of the DC to DC converter allows for the module to optimize the use of each converter. In at least some embodiments the control circuitry monitors the DC to DC converters individually. Differences in converter performance may be minimized by monitoring the DC to DC converters individually and adapting control of the converters to, for example, balance load between the converters.

Also illustrated within FIG. 3A are optional smoothing capacitors 371, 372 and switches 361 as discussed above. Furthermore, monitoring devices 335, 337 are provided which communicate with the control circuitry 350 via communications ports 336, 332. These monitoring devices may be, for example, thermometers for monitoring a battery temperature, encoders for monitoring a motor speed or other encoders for providing state information about attached devices. Once again a communications port 334 is provided to source information about a connected electrical energy source.

Figure 3B:
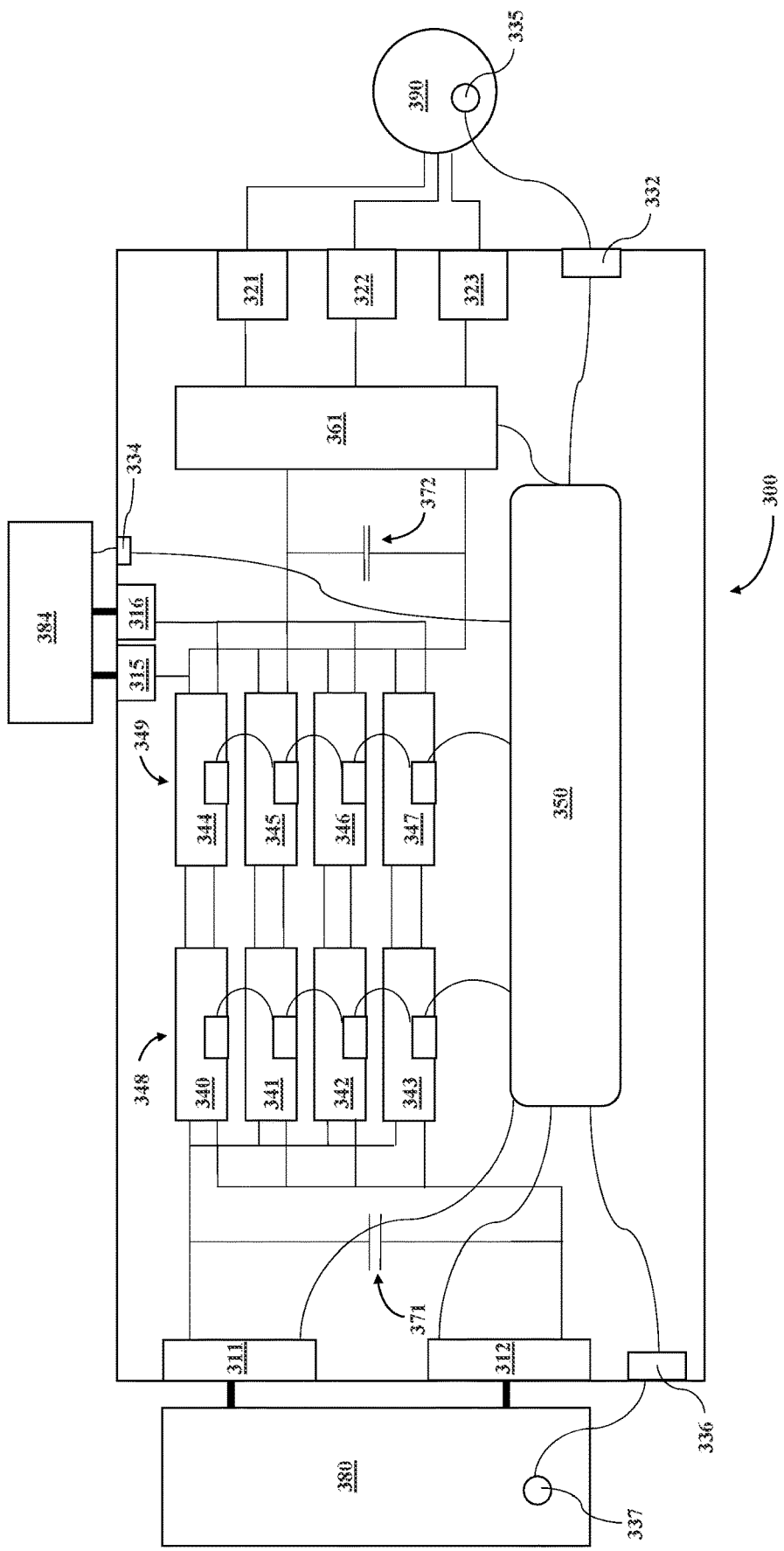

FIG. 3B shows a DC to DC converter module 300 according to at least some embodiments of the present invention having all of the same components as the embodiment of FIG. 3A, but a different arrangement. Within FIG. 3B the second input terminals 315, 316 are connected at the outputs of the second stage of DC to DC converters 349. This arrangement provides for the ability to adjust the voltage in stages and optimize the overall efficiency of the DC to DC conversion process. For example, certain DC to DC converters have limited conversion factors or are inefficient outside of a certain conversion factor range. By having two or more stages of DC to DC converters, each stage may be operated independently to arrive at the most efficient overall conversion.

At least some embodiments of the present invention employ multiple stages of DC to DC converters. For example, the first and second stages of FIG. 3A may be split into multiple stages themselves.

Within certain DC to DC converter modules according to the present invention the control circuitry is further configured to monitor at least one of a voltage and current at the first input terminals, said control circuity being configured to control the DC converters based at least partially on a combination of the three monitored values. That is, conditions monitored at all input and output terminals.

At least some DC to DC converter modules according to the present invention have control circuitry which contains profiles having information on various energy sources. For example, the control circuitry may be configured such that it has knowledge of the IV curves for a variety of PV panels and thus can operate the attached DC to DC converters in an optimal fashion for each of the PV panels. Another example would be a source profile for an attached wind turbine which would let the control circuitry know when the turbine could be relied upon to source current. Further profile contents could include maximum voltage or current limitations for individual sources, loads or storage devices.

Various terminals of the various DC to DC converter modules discussed herein are referenced as input and output terminals. It should be understood that these are designations to aid in understanding of the embodiments discussed. However, each terminal of the DC to DC converter modules according to the present invention may act as an input or an output. This is at least the case because the DC to DC converter or converters may be operated to guide the flow of energy in either direction through the terminals. For example, the first input terminals, when connected to an energy storage device such as a battery, may act as both a source and sink for electrical energy. Examples of certain embodiments of the present invention further clarifying this concept are provided below.

At least some embodiments of the present invention are configured to be employed between an energy storage device or other load and multiple energy sources. In reference to the arrangement provided in FIG. 1, a battery or load would be connected at the output terminals, a first energy source at the first input terminals and a second energy source at the second input terminals. For example, a battery bank could be connected to the output, a wind turbine to the first input terminals and a solar panel to the second input terminals. In this configuration the variable voltage output of the wind turbine could be utilized even when the wind is not strong enough to provide a consistently high voltage output from the wind turbine. The DC to DC converters can be employed to adjust the voltage of the wind turbine such that it would be sufficient to charge the battery even at low wind speeds.

In certain embodiments of the present invention the DC to DC converter is configured for use between two energy sources and a load, the load being connected at the first input terminals. For example, two intermittent energy sources could be connected at the second input terminals and output terminals of the arrangement within FIG. 1. A battery or other load would then be connected at the first input terminals. In this arrangement the energy provided by the two intermittent sources can be employed even when the voltage supplied would normally be insufficient. For example, the DC to DC converter could be employed to raise the low voltage provided by a wind turbine at low speed to a voltage sufficient to charge the battery or run the other connected load. In certain embodiments switches are employed to disconnect one or the other connected energy source.

DC to DC converter modules according to at least some embodiments of the present invention may be operated in a variety of modes. For example, they may be operated in a charging mode wherein a connected electric load is not in use. This could be the case when employed on a sailboat and the electric motor is not being run but the electric energy source, for example a PV panel, is still providing charging current for a connected battery bank. In such a mode, the DC to DC converter module is operating to ensure that the electrical energy source is charging the batteries in as efficient a manner as possible. This can be accomplished, for example, by having a profile which details the optimal load for a given electric power source under certain conditions.

Another example of an external power source can be an AC/DC converter operating in constant current or constant voltage mode. Regardless of the source, when an electric energy storage device, such as a battery, connected to a DC to DC converter according to at least some embodiments of the present invention is fully charged, the converter module stops providing current from the intermediate circuit to the battery. This may be accomplished, for example, by causing the intermediate voltage to increase, stopping the energy flow from the charger.

At least some DC to DC converter modules according to the present invention are configured to operate in a solar mode. Within such a mode the module allows a connected solar panel to be connected to the intermediate circuit, and utilize the energy coming from the panel as efficiently as possible. The module can use the energy from the solar panel directly for driving of an attached electric load, for charging of an attached energy storage device only, for driving and charging at the same time, or for driving together with some energy taken from the battery. As can be seen, DC to DC converter modules having multiple stages according to the present invention allow for a wide variety of uses and allow for the most efficient operation of electrical systems in a variety of applications.

DC to DC converter modules according to certain embodiments of the present invention are configured to monitor a response to varied voltage or current at one of the terminals. For example, the module of FIG. 1 may be configured to adjust the DC to DC converter such that the voltage at the second input terminals varies across a range. The control circuitry would then determine a change in current as the voltage was varied and therefore determine the power available from an energy source attached at the second terminal. At least some embodiments provide for DC to DC converter modules which monitor how connected energy sources react to varied loads. In this minor the variable load can be used, for example, to determine the behavior or efficiency of an attached source, such as an attached PV panel.

Certain DC to DC converter modules according to the present invention are adapted to implement a MPPT solution. That is, in order to allow the most efficient operation of attached solar panels the converter module adjusts the DC to DC converters based on a known or presumed IV curve for the attached panels.

Within at least some DC to DC converter modules according to the present invention there is provided an external switch for disconnecting a charging source from the second input terminals.

Certain modules according to the present invention incorporate a resistive load, possibly an adaptive resistance, connected at the second input terminals. This resistor may be employed by the control circuitry to measure the energy available from an attached energy source. This may be accomplished, for example, by shorting the energy source across the resistive load and monitoring a response. When employed with a PV panel this method can be used to determine if the voltage of the panel drops to a safe level under load or if the panel has accumulated too much charge to safely be connected to the converter module. This may happen, for instance, when a solar panel is left in the sun without the possibility to discharge and a voltage accumulates which must be discharged to allow the solar panel to supplying a steady voltage.

Control circuitry according to the present invention may be implemented as a completely hardware based solution, a combination of hardware and firmware or even a software solution. This allows for updating of the profiles or control schemes of the DC to DC converter as new energy sources and storage means are implemented.

Within at least some solutions according to the present invention external switches are employed to disconnected at least some of the externally connected devices. For example external switches in communication with the control circuitry of the DC to DC converter module may be implemented to disconnect a connected PV panel when it is not providing a charging current. External switches may also be implemented and controlled to disconnected a battery or load in case of a dangerous overload or overcharge situation.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

ACRONYMS LIST

AC Alternating Current
DC Direct Current
MOSFET Metal-Oxide-Semiconductor Field-Effect Transistor
MPPT Maximum Power Point Tracking
PV Photovoltaic

REFERENCE SIGNS LIST

100 DC to DC converter module
111, 112 First input terminals
113 Inputs of the DC to DC converter
114 Outputs of the DC to DC converter
115, 116 Second input terminals
121, 122 Output terminals
134 Communications interface
135 Input
141 DC to DC converter
150 Control circuitry
180 Electrical storage device
184 Electric power source
190 Electric load
200 DC to DC converter module
211, 212 First input terminals
215, 216 Second input terminals
221, 222 Output terminals
234 Communications interface
235 Input
241-244 DC to DC converters
250 Control circuitry
260, 261 Switches 280 Electrical storage device
284 Electric power source
290 Electric load
300 DC to DC converter module
311, 312 First input terminals
315, 316 Second input terminals
321, 322 Output terminals
332 Communications port
334, 336 Communications ports
335, 337 Monitoring devices
340-347 DC to DC converters
348 First stage of DC to DC converters
349 Second stage of DC to DC converters
350 Control circuitry
361 Switches
371, 372 Smoothing capacitors
380 Electrical storage device
384 Electric power source
390 Electric load

The invention claimed is:

1. A direct current (DC) to DC converter module for use between an electrical storage device, electric power source, and an electric load, the DC to DC converter module comprising:
   at least one DC to DC converter;
   first input terminals connected to inputs of the DC to DC converter and configured to provide a source voltage from an electrical storage device;
   output terminals connected to outputs of the DC to DC converter and configured to provide an output voltage to an electric load;
   second input terminals connected to the outputs of the DC to DC converter and configured to provide a charging voltage to the output of the DC to DC converter from an electric power source, and
   control circuitry connected to the DC to DC converter, the control circuitry being configured to monitor at least one electric parameter at at least one of the terminals, wherein the control circuitry is configured to adjust a gain or a conversion factor of the DC to DC converter based at least partially on the monitored electric parameter,
   wherein the DC to DC converter module further comprising a plurality of DC to DC converters arranged in at least two stages, a first stage arranged to convert the source voltage to an intermediate voltage and a second stage arranged to convert the intermediate voltage to the output voltage, the second input terminals being connected at the intermediate voltage.

2. The DC to DC converter module of claim 1, further comprising an input configured to receive a signal indicative of a desired power delivery to the electric load, wherein the control circuitry is further configured to adjust the gain or the conversion factor of the DC to DC converter based at least partially on the signal indicative of the desired power delivery.

3. The DC to DC converter module of claim 1, wherein the control circuitry is configured to monitor at least one electric parameter of the second input terminals and adjust the gain or the conversion factor of the DC to DC converter based at least partially on the monitored electric parameter of the second input terminals.

4. The DC to DC converter module of claim 1, wherein the electric parameter is at least one of: a voltage, current, frequency, phase, phase shift, or any combination thereof.

5. The DC to DC converter module of claim 1, wherein the control circuitry is further configured to monitor at least one electric parameter of the first input terminals, the control circuitry being configured to adjust the gain or conversion factor of the DC to DC converter based at least partially on the monitored electric parameter of the first input terminals.

6. The DC to DC converter module of claim 1, wherein the control circuitry is further configured to adjust the gain or the conversion factor of the DC to DC converter to maintain at least one of the monitored electric parameters within a preset range.

7. The DC to DC converter module of claim 1, wherein the control circuitry is configured to adjust the gain of the DC to DC converter in one or more preset fashions, the preset fashions being configured such that energy flows either:
   a) from the second input terminals solely to the first input terminals,
   b) from the second input terminals solely to the output terminals,
   c) from the second input terminals to both the first input terminals and output terminals, or
   d) from both the first input terminals and second input terminals to the output terminals.

8. The DC to DC converter module of claim 2, wherein the control circuitry is configured to adjust the gain or the conversion factor of the DC to DC converter based at least in part on a combination of the signal indicative of the desired power delivery and the monitored electric parameter.

9. The DC to DC converter module of claim 1, wherein the control circuitry is further configured to monitor at least one electric parameter at each of the first input terminals, second input terminals and output terminals, the control circuitry being configured to adjust the gain or the conversion factor of the DC to DC converter based at least partially on a monitored value from each of the terminals.

10. The DC to DC converter module of claim 1, further comprising a switch located between the second input terminals and the DC to DC converter, said switch being configured to disconnect an attached energy source.

11. The DC to DC converter module of claim 1, further comprising a load switch located between the output of the DC to DC converter module and the output terminals, the load switch being connected to the control circuitry and configured to control the output of the converter module in order to control the operation of a connected load.

12. The DC to DC converter module of claim 1, wherein the control circuitry contains profiles having information on various energy sources.

13. The DC to DC converter module of 1, wherein the control circuitry is comprised of hardware and firmware.

14. The DC to DC converter module of claim 1, further comprising a communications interface connected to the control circuitry, said communications interface being configured to provide information on a state of a connected load or energy source connected at one of the terminals.

* * * * *